United States Patent [19]

Hammann et al.

[11] 3,957,666

[45] May 18, 1976

[54] PHENOXYBIPHENYL AND PHENOXYTERPHENYL COMPOUNDS AND COMPOSITIONS

[75] Inventors: William C. Hammann, Creve Coeur; Robert M. Schisla, Kirkwood, both of Mo.

[73] Assignee: Monsanto Company, St. Louis, Mo.

[22] Filed: May 30, 1974

[21] Appl. No.: 474,484

Related U.S. Application Data

[60] Division of Ser. No. 247,528, April 26, 1972, Pat. No. 3,860,661, which is a continuation-in-part of Ser. No. 845,079, July 25, 1969, abandoned, which is a continuation-in-part of Ser. No. 801,875, Aug. 19, 1968, abandoned, which is a division of Ser. No. 310,457, Sept. 20, 1963, Pat. No. 3,406,207.

[52] U.S. Cl. ............................................. 252/73
[51] Int. Cl.$^2$ ..................... C09K 3/00; C10M 3/14
[58] Field of Search ..................... 252/73, 67, 52 R; 260/613 R

[56] References Cited

UNITED STATES PATENTS

| | | | |
|---|---|---|---|
| 3,406,207 | 10/1968 | Scnisla et al. | 252/73 X |
| 3,471,574 | 10/1969 | Hammann et al. | 252/73 X |
| 3,565,960 | 2/1971 | Scnisla et al. | 252/73 X |
| 3,860,661 | 1/1975 | Hammann et al. | 252/73 X |

*Primary Examiner*—Harris A. Pitlick
*Attorney, Agent, or Firm*—H. B. Roberts

[57] ABSTRACT

Compounds of classes represented by phenoxybiphenyl and terphenyl compounds having from 5 to 10 aromatic rings and from 2 to 8 oxy ether linkages wherein at least 40% of the total linkages are in the meta position, which exhibit liquid properties over a wide range, and compositions containing said liquid compounds together with other fluids representative of which are polyphenyl ethers. These compounds and compositions have many uses, among which are hydraulic fluids and heat transfer fluids.

2 Claims, No Drawings ns. Such fluids have been used as electronic coolants, diffusion pump fluids, synthetic lubricants, damping fluids, bases for greases, force transmission fluids (hydraulic fluids), heat transfer fluids, die casting release agents in metal extrusion processes and as filter mediums for air conditioning systems. Because of the wide variety of applications and the varied conditions under which functional fluids are utilized, the properties desired in a good functional fluid necessarily vary with the particular application requiring a functional fluid having a specific class of properties.

PHENOXYBIPHENYL AND PHENOXYTERPHENYL COMPOUNDS AND COMPOSITIONS

CROSS REFERENCE TO RELATED APPLICATIONS

This is a division of application Ser. No. 247,528, filed Apr. 26, 1972, and now U.S. Pat. No. 3,860,661, which is a continuation in part of Ser. No. 845,079 filed July 25, 1969, now abandoned which is a continuation in part of Ser. No. 801,875 filed Aug. 19, 1968, now abandoned, which is in turn a division of Ser. No. 310,457 filed Sep. 20, 1963, now U.S. Pat. No. 3,406,207.

BACKGROUND OF THE INVENTION

1. Field of the Invention

This invention relates to certain new phenoxybiphenyl and terphenyl compounds, to compositions containing phenoxy-biphenyl and terphenyl compounds in admixture with polyphenyl ethers, and to the application of these compounds and mixtures as functional fluids.

2. Description of the Prior Art

Many different types of materials are utilized as functional fluids and functional fluids are used in many different types of applications. Such fluids have been used as electronic coolants, diffusion pump fluids, synthetic lubricants, damping fluids, bases for greases, force transmission fluids (hydraulic fluids), heat transfer fluids, die casting release agents in metal extrusion processes and as filter mediums for air conditioning systems. Because of the wide variety of applications and the varied conditions under which functional fluids are utilized, the properties desired in a good functional fluid necessarily vary with the particular application requiring a functional fluid having a specific class of properties.

Of the foregoing, the use of functional fluids as heat transfer fluids has posed what is probably the most difficult areas of application. Thus, the requirements of a heat transfer fluid are as follows: The fluid should be liquid over a wide temperature range, and in general have a low vapor pressure so as to be utilized at atmospheric pressure. Such fluid should be operable as a heat transfer media over an extended period of time at given temperatures, and should exhibit a hign-degree of thermal and hydrolytic stability. Thus, a heat transfer fluid is often required to operate at temperatures in the order of 700°F. or higher over extended periods of time. Such fluids, in addition, should be non-corrosive to metals with which they are in contact and in particular such fluids should be non-corrosive at the required operating temperature.

For vacuum pump diffusion oils, the viscosity characteristics of the fluid must be such that it may be used over a wide temperature range; that is, adequately high viscosity at high temperature, low viscosity at low temperature and a low rate of change of viscosity with temperature. Its volatility should be low at elevated temperatures of use and should be thermally and chemically stable in order to resist oxidation and decomposition so that it will remain uniform under conditions of use.

SUMMARY OF THE INVENTION

It has now been found that functional fluids which have excellent physical properties and which are particularly suitable for use as heat transfer fluids are obtained through the use of phenoxybiphenyl and -terphenyl compounds having from 5 to 10 aromatic rings and from 2 to 8 oxyether linkages, characterized in that the number of aromatic rings is at least 2 greater than the number of oxyether linkages, and that at least 40% and preferably at least 50% of the total linkages are in the meta position.

Particularly preferred compositions are those having 6 phenyl rings and 4 oxyether linkages, such as 3,4'-bis(m-phenoxyphenoxy)biphenyl. Also preferred are mixtures of such di(phenoxyphenoxy)biphenyls wherein at least 40 percent of the total linkages in the mixture are in the meta position, such as a mixture of 3,3'- and 3,4'-bis(m-phenoxyphenoxy)biphenyl.

The phenoxybiphenyl and -terphenyl compounds either singularly or as mixtures can be blended together with other compounds such as bis(phenoxy)biphenyl compounds, phenoxyphenoxybiphenyl compounds and analogs thereof as well as polyphenyl ethers and polyphenyl thioethers.

DESCRIPTION OF PREFERRED EMBODIMENTS

The preferred phenoxybiphenyl and -terphenyl compounds of this invention include those compounds randomly constructed of $a$ aromatic rings and $b$ oxyether linkages, where $a$ is an integer of from 5 to 10, and $b$ is an integer determined by the following relationships:

when $a$ is 5 to 7, $b = 2$ to $a - 2$
when $a$ is 8 to 10, $b = a - 5$ to $a - 2$, and further characterized in that at least 50% of the total linkages are in the meta position.

The phenoxybiphenyl and -terphenyl compounds as defined in this invention have been found to be especially good functional fluid compositions having high thermal stability, high oxidative stability, high hydrolytic stability, low vapor pressure at elevated temperatures, wide liquid range, good viscosity characteristics, good lubricating properties and good metal compatibility when in contact with metal mechanical members of fluid handling systems. The functional fluids of this invention are particularly useful as inexpensive high temperature heat transfer fluids. These fluids are also generally useful as high vacuum diffusion pump oils, dielectric fluids, coolant moderators for nuclear reactors, and as high temperature lubricants and lubricant base stock.

The phenoxybiphenyl and -terphenyl compounds of this invention are compatible with the lower molecular weight phenoxybiphenyl and -terphenyl compounds having four and less aromatic groups, and with the polyphenyl ethers, and may be mixed with these compounds to form fluids for special end uses. In general, the phenoxybiphenyl and -terphenyl compounds of this invention are present in the mixture compositions in a major amount by weight, more particularly in a concentration by weight of 60% to 90% or more.

Typical examples of bis(phenoxy)biphenyl compounds which can be blended with the phenoxybiphenyl and -terphenyl compounds of this invention are 2,3-, 3,3'-, 3,4'-, and 3,4-bis(phenoxy)biphenyls.

Typical examples of polyphenyl ether compounds which can be admixed with the liquid phenoxybiphenyl and -terphenyl compounds of this invention are bis(- phenoxyphenyl) ethers, e.g., bis(m-phenoxphenyl) ether; the bis(phenoxyphenoxy)benzenes, e.g., m-bis(m-phenoxyphenoxy)benzene, m-bis(p-phenoxyphenoxy)benzene, o-bis(o-phenoxyphenoxy)benzene; the bis(phenoxyphenoxyphenyl) ethers, e.g., bis[m-(m-phenoxyphenoxy)phenyl] ether, bis[p-(p-phenoxyphenoxy)phenyl[ ether, m-(m-phenoxyphenoxy)phenyl ether, m-(o-phenoxyphenoxy)phenyl ether; and the bis(phenoxyphenoxyphenoxy)benzenes, e.g., m-bis[m-(m-phenoxyphenoxy)phenoxy]benzene, p-bis-[p-(m-phenoxyphenoxy)phenoxy]benzene, m-bis[m-(p-phenoxyphenoxy)phenoxy]benzene and mixtures thereof with other polyphenyl ethers.

The phenoxybiphenyl and -terphenyl compounds of this invention can be prepared by the reaction of a halogenated benzene, -biphenyl or -terphenyl compound or a halogenated phenoxybenzene, -biphenyl or -terphenyl compound, with a phenolic or a phenoxyphenolic compound such as an alkali metal salt, especially the potassium salt, of phenol or phenoxyphenol. It is to be understood that the above compositions broadly designated as "phenoxy" compounds may contain more than one phenoxy group. Likewise, the above designated halogenated compounds may include more than one halogen atom. For example, halogenated phenoxybiphenyl is meant to include such compounds as 3,4'-dichloro-3'-(m-phenoxy-phenoxy)biphenyl. The reaction in accordance with this invention is conducted at a temperature range of from about 175°C. to about 225°C., preferably from about 175°C. to about 210°C. for a period of time of about 1 to about 16 hours or longer. Said reactions can be carried out in the presence of a copper catalyst which can be powdered metallic copper, copper hydroxides, a copper salt such as cuprous chloride, cupric chloride, etc., or mixtures thereof. Whereas the exact quantity of the copper catalyst is not critical, amounts of the order of about 1 to about 6 mole percent of copper, based on the total mole equivalence of the halogen groups of the dihalobiphenyl or dihaloterphenyl compound, have been found to be satisfactory. However, it will be understood that smaller and larger amounts of catalysts can be employed as desired.

After the benzene, biphenyl or terphenyl compound is reacted with the alkali metal phenate at the stated temperatures for from about 1 to about 12 hours, the reaction mixtures is cooled and poured into a dilute aqueous caustic solution and extracted with a number of portions of inert solvent, such as benzene, toluene, xylene, carbon tetrachloride, and the like, whereby the aqueous phase removes the alkali halide salt from the system. The combined organic phase is then preferably washed with several portions of dilute potassium hydroxide solutions followed by several washings with water alone, and then the organic phase is dried over a desiccant such as anhydrous magnesium sulfate, filtered, and the organic solvent removed by distillation, whereby the phenoxybiphenyl and terphenyl compounds are retained in the distillation vessel. The reaction product can then be distilled through a Vigreaux column to obtain the phenoxybiphenyl and -terphenyl compounds per se.

It will also be understood that the phenoxybiphenyl and -terphenyl compounds of the instant invention can be treated with active charcoal, attapulgus earth, and/or alumina in a suspended state by mild agitation either at room or elevated temperature and subsequently filtered. The phenoxybiphenyl and -terphenyl compounds also can be taken up in an organic solvent such as benzene, and the organic solution treated with the aforesaid materials, filtered and the organic solvent removed by distillation under reduced pressure.

The preferred halogen has been found to be either chloro or bromo with chloro being the most preferred. Thus, it is preferred to use, for example, a mono- or dichlorobenzene, a mono- or dichlorobiphenyl or -terphenyl as a starting reactant in preparing the compounds of the present invention.

Typical examples of biphenyl and terphenyl compounds which can be utilized to prepare the compounds of this invention, particularly the chloro and bromo derivatives thereof are bromo benzene, m-dichlorobenzene, 2,2'-dichlorobiphenyl, 2,3'-dichlorobiphenyl, 2,4'-dichlorobiphenyl, 3,3'-dichlorobiphenyl, 2,3-dichlorobiphenyl, 2,4-dichlorobiphenyl, 2,5-dichlorobiphenyl, 2-chlorobiphenyl, 3-chlorobiphenyl, 4-chlorobiphenyl, 3,3'-dibromo-m-terphenyl, 4'-bromo-m-terphenyl, 3'-bromo-m-terphenyl, 3-bromo-m-terphenyl, 4-bromo-m-terphenyl, 3'-bromo-o-terphenyl, 4'-bromo-o-terphenyl, 3'-bromo-p-terphenyl, 2-bromo-p-terphenyl, 3-bromo-p-terphenyl, 3-chloro-3'-phenoxyterphenyl, 4-chloro-3'-(m-phenoxy-phenoxy)terphenyl, 3-chloro-3'-[m-(o-phenoxyphenoxy)phenoxy]-m-terphenyl, 3-chloro-4'-[m-(m-phenoxyphenoxy)phenoxy]-m-terphenyl, 4-chloro-3'-[o-(m-phenoxyphenoxy)phenoxy]-m-terphenyl, 2,2'-dichloro-3'-phenoxy-p-terphenyl, 2,4'-dichloro-3'-phenoxy-o-terphenyl, 2,4'-dichloro-3'-(m-phenoxyphenoxy)-m-terphenyl.

Typical examples of phenolic compounds which can be utilized to prepare the compounds of this invention are phenol, o-phenoxyphenol, m-phenoxyphenol, p-phenoxyphenol, m-(m-phenoxyphenoxy)phenol, o-(m-phenoxyphenoxy)phenol, p-(m-phenoxyphenoxy)phenol, m-(o-phenoxyphenoxy)phenol and m-(p-phenoxy)phenoxyphenol, m-(m-phenoxyphenoxy)phenol, m-phenylphenol, 3-hydroxy-m-terphenyl.

In addition, it is contemplated within the scope of this invention that mixtures of phenoxybiphenyl and -terphenyl compounds can be prepared as when a mixture of chlorinated biphenyl compounds, such as chlorinated biphenyl compositions containing about 32% chlorine corresponding to an average composition containing 2 atoms of chlorine per molecule of biphenyl, is utilized as a starting reactant to be interacted as, for example, with m-phenoxyphenol. Thus, a mixture of compounds of this invention is prepared which is useful in the many applications as set forth above, particularly for use as a heat transfer fluid. In preparing the mixture of phenoxybiphenyls and -terphenyls, the same process conditions are utilized as used in the preparation of the pure compounds.

The phenoxybiphenyl and -terphenyl compounds of this invention are conveniently referred to as a phenyl b oxyethers, where a is the number of phenyl groups and b is the number of oxyether linkages. The term "phenyl" as used herein is meant to include mono-, di- and trivalent radicals derived from benzene by abstraction of one, two or three hydrogen atoms; i.e.,

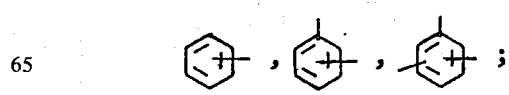

and the term oxyether is meant to designate the —O— structure. As previously described, the compounds included within the scope of this invention are those having from 5 to 10 phenyl groups and from 2 to 8 oxyether linkages, but subject to the following relationship, that when $a$ is 5 to 7, $b$ is 2 to $(a-2)$, and
when $a$ is 8 to 10, $b$ is $(a-5)$ to $(a-2)$, and further subject to the limitation that at least 40% and preferably 50% of the total linkages are in the meta position. Specific examples of the preferred $a$ phenyl $b$ oxyether compounds included within the scope of this invention are given below to more clearly illustrate the invention. Examples of the preparation of some typical compounds are also provided. The specific compounds mentioned are for illustration only, and the list is not intended to be exhaustive nor to limit the scope of the invention. The exemplary compounds are given in order of increasing molecular weight.

1. 5 phenyl 2 oxyether
    3,3'-diphenoxy-m-terphenyl
    4'-(m-phenoxyphenoxy)-m-terphenyl
2. 5 phenyl 3 oxyether
    3-phenoxy-3'-(m-phenoxyphenoxy)biphenyl
    3-phenoxy-3'-(o-phenoxyphenoxy)biphenyl
    3-phenoxy-4'-(m-phenoxyphenoxy)biphenyl
    4-phenoxy-3'-(m-phenoxyphenoxy)biphenyl
    3-[m-(m-phenoxyphenoxy)phenoxy]biphenyl
    3-[o-(m-phenoxyphenoxy)phenoxy]biphenyl

EXAMPLE I

Preparation of
3-Phenoxy-3'-(m-phenoxyphenoxy)biphenyl

A 500 ml. reaction flask equipped with stirrer, condenser and Dean-Stark trap was charged with 250 g. (2.66 moles) of phenol. This was heated with stirring at 100°C. while 56 g. (1.0 mole) of potassium hydroxide was added in increments. Toluene (50 ml.) was then added to the fluid mass and water azeotroped from the system. After all toluene and water had been removed, 150 ml. of diglyme was added together with 5.0 g. (0.05 mole) of cuprous chloride and 1.0 g. of copper powder. To this mixture 20 g. (0.053 mole) of 3-chloro-3'-(m-phenoxyphenoxy)biphenyl in diglyme was added over a 30 minute period. Diglyme was distilled from the mixture which was then heated at 240° for 18 hrs. On cooling the mixture was slurried in 200 ml. of ether and salts were filtered off. The ethereal solution was washed with 25% potassium hydroxide solution, water until neutral and then dried over magnesium sulfate. The ether was removed under vacuum and the resulting oil distilled to give 13.1 g. of the desired product, bp 248°–253°/0.06 mm., $n_D^{25}$ 1.6474.

Synthesis of the key intermediate compound 3-chloro-3'-(m-phenoxyphenoxy)biphenyl used in the above preparation is described in the procedure of Example III.

Calculated for $C_{30}H_{22}O_3$: C, 83.7; H, 5.2. Found: C, 83.2; H, 5.2.

3. 6 phenyl 2 oxyether
    1-(2,4-diphenylphenoxy)-3-(3-phenylphenoxy)benzene
    3-(2,4-diphenylphenoxy)-3'-phenoxybiphenyl
    3-(3-phenylphenoxy)-3'-phenoxy-p-terphenyl
    4-[m-(m-phenylphenoxy)phenoxy]-m-terphenyl
4. 6 phenyl 3 oxyether
    4'-[m-(m-phenoxyphenoxy)phenoxy]-m-terphenyl
    4'-[m-(o-phenoxyphenoxy)phenoxy]-m-terphenyl
    4'-[m-(p-phenoxyphenoxy)phenoxy]-m-terphenyl
    4-[m-(m-phenoxyphenoxy)phenoxy]-m-terphenyl

EXAMPLE II

Preparation of
4'-[m-(m-Phenoxyphenoxy)phenoxy]-m-terphenyl

A 500 ml. flask equipped with dropping funnel, stirrer, thermometer, and a Dean-Stark trap surmounted by a Friedrichs condenser, was charged with 100 g. (0.36 mole) of m-(m-phenoxyphenoxy)phenol and 9.5 g. of potassium hydroxide. The reaction mixture was heated with stirring until the potassium hydroxide had completely dissolved; then 250 ml. of toluene was added to azeotrope the theoretical amount of water. Toluene was then distilled from the system until the temperature reached 200°C. After the temperature of the reaction mixture had returned to 150°C., 100 ml. of diglyme was added, together with 2.5 g. of cuprous chloride and 0.5 g. of copper powder.

The temperature was gradually increased to 160°C. and 20.6 g. (0.067 mole) of 4'-bromo-m-terphenyl, dissolved in 40 ml. of diglyme, was added dropwise. The reaction was allowed to continue for 10 hr. at 185°C. It was then diluted with ethyl ether and filtered. The ether layer was washed with 200 ml. of 25% aqueous potassium hydroxide, followed by water washing until neutral. The aqueous washes were extracted with 200 ml. of ethyl ether, the ether layers combined, washed with distilled water until neutral, dried over magnesium sulfate, and filtered. A brown viscous liquid was obtained upon removal of the ether. This material was distilled to obtain 23.5 g. of 4'-[m-(m-phenoxyphenoxy)phenoxy]-m-terphenyl, as a yellow viscous liguid, bp 337°C/0.07 mm. Final purification of this material was effected as described above in Example I.

Calculated for $C_{36}H_{26}O_3$: C, 85.2; H, 5.2. Found: C, 85.4; H, 5.2.

Synthesis of the key intermediate 4'-bromo-m-terphenyl used in the preceeding preparation was according to the following procedure.

A 1 liter flask equipped with a stirrer, thermometer, reflux condenser, and dropping funnel was charged with 300 g. (1.3 moles) of terphenyl and 250 ml. of ethylene dichloride. The resulting mixture was heated to 80°C., and several ml. of bromine, several grams of freshly cleaned iron filings, and a few drops of water were added to the reaction mixture. As soon as bromination started, the reaction mixture was cooled to room temperature. A total of 177 g. (1.11 moles) of bromine was added over a period of 3 hr. The reaction mixture was cooled in an ice-water bath and filtered to remove 4'-bromo-p-terphenyl as a red-brown solid. The filtrate was concentrated under vacuum and the resulting oil treated with a 10% sodium sulfite solution to remove excess bromine, followed by washing with 5% potassium hydroxide solution. The crude bromide was distilled under reduced pressure to give 93.9 g. of 4'-bromo-m-terphenyl, bp 200°–204°C./1.9 mm.

5. 6 phenyl 4 oxyether
    3,3'-bis(m-phenoxyphenoxy)bipheny
    3,3'-bis(p-phenoxyphenoxy)biphenyl
    3-(m-phenoxyphenoxy)-3'-(o-phenoxyphenoxy)-biphenyl
    3-(m-phenoxyphenoxy)-3'-(p-phenoxyphenoxy)-biphenyl
    3-(p-phenoxyphenoxy)-4'-(m-phenoxyphenoxy)-biphenyl

EXAMPLE III

Preparation of 3,3'-Bis(m-phenoxyphenoxy)biphenyl

A 500 ml. four-necked flask equipped with stirrer, thermometer, and Dean-Stark strap surmounted by a Friedrichs condenser, was charged with 93.5 g. (0.505 mole) of m-phenoxyphenol, and 30.8 g. (0.50 mole) of potassium hydroxide was added in increments with stirring at 100°C. After the initial exothermic reaction had subsided, 80 ml. of toluene was added and water azeotroped from the reaction mixture until the theoretical amount had been collected, including that from the potassium hydroxide. The toluene was distilled from the reaction mixture until the pot temperature reached 230°C. After cooling to 150°C., 100 ml. of diglyme was added together with 7 g. of cuprous chloride and 2 g. of copper powder. The reaction mixture was then heated with stirring to 170°C. and 129.3 g. (0.57 mole) of 3,3'-dichlorobiphenyl was added over a 1 hr. period. Diglyme was distilled from the reaction mixture until the pot temperature reached 235°C. when reaction was continuted for 18 hours. On cooling, the reaction mixture was diluted with an equal volume of ether, and filtered to remove copper and potassium salts. The ethereal solution was washed three times with 150 ml. portions of 20% potassium hydroxide followed by water washing until nuetral. The water and potassium hydroxide layers were extracted with additional ether, the ether solutions combined and dried over anhydrous magnesium sulfate. After filtration, the ether was removed under vacuum and a dark red-brown oil was distilled to yield 71.4 g. of the intermediate compound 3-chloro-3'-(m-phenoxyphenoxy)biphenyl, bp 220°–222°C/0.04 mm. and 17.2 g. of the desired product, bp 312°C./0.05 mm. Final purification of the desired product was effected by dissolving in ethyl ether, treating with 1.0 g. of activated charcoal, followed by filtration through filter aid and removal of ethyl ether under vacuum.

Product bp 312°C/0.05 mm; $n_D^{25}$ 1.6520

Calculated for $C_{36}H_{26}O_4$: C, 82.7; H, 5.0. Found: C, 82.4; H, 5.2.

EXAMPLE IV

Preparation of 3-(m-phenoxyphenoxy)-3'-(o-phenoxyphenoxy)biphenyl

A 500 ml. reaction flask equipped with stirrer, condenser, and Dean Stark trap was charged with 191 g. (1.03 moles) of o-phenoxyphenol, 50 ml. of toluene and 39.5 g. (0.70 mole) of potassium hydroxide. The mixture was heated to reflux and water azeotroped from the system. Diglyme (100 ml.) was then added followed by 20 g. (0.053 mole) of 3-chloro-3'-(m-phenoxyphenoxy)biphenyl over a 30 minute period. To this mixture 2.5 g. of cuprous chloride and 0.5 g. of copper powder was added and after removing the diglyme be distillation, the reaction mixture was heated at 230°–240° for 18 hours. The mixture was cooled, diluted with 500 ml. of ether and centrifuged to remove copper and potassium salts. The salts were washed with additional ether, and the ether fractions combined and washed with 25% potassium hydroxide solution followed by water washing to neutrality. After drying the ethereal solution over magnesium sulfate, and removing ether in vacuo, the resulting oil was distilled to give 16.9 g of the desired product, bp 255°–260°/0.02 mm.; $n_D^{25}$ 1.6480.

Calculated for $C_{36}H_{26}O_4$: C, 82.7; H, 5.0. Found: C, 83.0; H, 5.3.

EXAMPLE V

Preparation of 3-(m-phenoxyphenoxy)-3'-(p-phenoxyphenoxy)biphenyl

A 250 ml. reaction flask equipped with stirrer, dropping funnel, thermometer, and Dean-Stark trap surmounted by a Friedrichs condenser, was charged with 200 g. (1.07 moles) of p-phenoxyphenol, and 34.9 g. (0.567 mole) of potassium hydroxide was added in increments at 90°C. To the resulting melt was added 50 ml. of toluene and the theoretical amount of water azeotroped from the reaction mixture followed by removal of toluene up to 230°C. On cooling to 150°C., the reaction mixture was diluted with 150 ml. of diglyme and 5.0 g. of cuprous chloride and 1.0 g. of copper powder was added. Over a 45 min. period, 20 g. (0.054 mole) of 3-chloro-3'-(m-phenoxyphenoxy)biphenyl in diglyme was added, and the diglyme was removed by distillation. The stirred reaction mixture was heated at 235°C. for 19 hours. On cooling, an equal volume of ether was added and this mixture centrifuged to remove salts. The ethereal solution was washed with 25 % potassium hydroxide solution to remove excess phenol, water until neutral, and then dried over anhydrous magnesium sulfate. After filtration and concentration to remove ether, the oil obtained was distilled to obtain 17.5 g. of the desired product, bp 297°–302°C./0.05 mm.; $n_D^{25}$ 1.6500.

Calculated for $C_{36}H_{26}O_4$: C, 82.7; H, 5.0. Found: C, 82.5; H, 5.1.

6. 7 phenyl 2 oxyether
 1-(2,4-diphenylphenoxy)-3-[m-(3-biphenylyl)-phenoxy]benzene
 3-(2,4-diphenylphenoxy)-3''-phenoxy-m-terphenyl
 1-(3-phenylphenoxy)-3'''-phenoxy-m,m'-quaterphenyl
 3-(o-phenoxyphenoxy)-m,m';m''-quinquephenyl
 3-(2,4-diphenylphenoxy)-4'-phenoxy-p-terphenyl
 3-(2,4-diphenylphenoxy)-4''-phenoxy-m-terphenyl 7. phenyl 3 oxyether
 3-phenoxy-5'''-(m-phenoxyphenoxy)-m,m'-quaterphenyl
 3-[o-(p-phenoxyphenoxy)phenoxy]-m,m'-quaterphenyl
 3-o-[m-(o-phenylphenoxy)phenoxy]phenoxy -m-terphenyl
 4-o-[m-(p-phenylphenoxy)phenoxy]phenoxy -m-terphenyl
 3-[m-(m-biphenylylphenoxy)phenoxy]-m-terphenyl
 4-[o-(m-biphenylylphenoxy)phenoxy]-m-terphenyl 8. 7 phenyl 4 oxyether
 3-m-[o-(m-phenoxyphenoxy)phenoxy]phenoxy-m-terphenyl
 3-[m-(m-phenoxyphenoxy)phenoxy]-3''-phenoxy-m-terphenyl
 3-(p-phenoxyphenoxy)-3''-(m-phenoxyphenoxy)-m-terphenyl
 3-(m-phenoxyphenoxy)-3''-(o-phenoxyphenoxy)-m-terphenyl 9. 7 phenyl 5 oxyether
 3-(m-phenoxyphenoxy)-3'-[o-(m-phenoxyphenoxy)phenoxy]biphenyl 3-phenoxy-3'-m-[m-(m-phenoxyphenoxy)phenoxy]-
    phenoxy biphenyl
3-(o-phenoxyphenoxy)-3'-[m-(m-phenoxyphenoxy)-
    phenoxy]biphenyl
3-(p-phenoxyphenoxy)-3'-[m-(m-phenoxyphenoxy)-
    phenoxy]biphenyl

EXAMPLE VI

Preparation of
3-(m-phenoxyphenoxy)-3'-[m-(m-phenoxyphenoxy)-
phenoxy]biphenyl

A 500 ml. reaction flask equipped with stirrer, condenser and Dean-Stark trap was charged with 59.8 g. (0.215 mole) of m-(m-phenoxyphenoxy)phenol, 50 ml. of toluene and 7.2 g. (0.129 mole) of potassium hydroxide. Water was azeotroped from the system and 100 ml. of diglyme added followed by dropwise addition of 20 g. (0.053 mole) of 3-chloro-3'-(m-phenoxyphenoxy)biphenyl over a 30 min. period. To this mixture 2.5 g. of cuprous chloride and 0.5 g. of copper powder was added. Diglyme was distilled from the system and the resulting mixture heated at 230°–240°C. for 18 hours. At the end of this time, 250 ml. of ether was added to the cooled mixture and the resulting slurry centrifuged to remove salts. The ethereal solution was washed thoroughly with aqueous base, water and then dried over anhydrous magnesium sulfate. The ether was removed under vacuum, and the resulting oil was distilled to give 24.4 g. of the desired product, bp 340°/0.05 mm., $n_D^{25}$ 1.6510.

Calculated for $C_{42}H_{30}O_5$: C, 82.0; H, 4.9. Found: C, 81.8; H, 5.0.

10. 8 phenyl 3 oxyether

3-[m-(m-phenoxyphenoxy)phenoxy]-m,m',m''-
    quinquephenyl
3-phenoxy-3'-(m-phenoxyphenoxy)-m,m',m''-quin-
    quephenyl
bis m-[m-(o-phenylphenoxy)phenyl]phenyl ether
3-{m-[m-(p-phenylphenoxy)phenoxy]phenoxy}-
    m,m'-quaterphenyl
3-m-{m-[o-(m-phenylphenoxy)phenyl]phenoxy}-
    phenoxy-p-terphenyl
4'-{m-[m-[p-(m-phenylphenoxy)phenyl]phenoxy]
    phenoxy}-p-terphenyl
4-{o-[m-[o-(m-phenylphenoxy)phenyl]phenoxy]
    phenoxy}-m-terphenyl 11. 8 phenyl 4 oxyether 3-{m-[o-(m-phenoxyphenoxy)phenoxy]phenoxy}-
    m,m'-quaterphenyl
3-[m-(o-phenoxyphenoxy)phenoxy]-3'-phenoxy-
    m,m'-quaterphenyl
3-[m-(p-phenoxyphenoxy)phenoxy]-3'-[m-(m-
    phenylphenyl)-phenoxy]biphenyl
3-{m-[m-[o-[m-(o-phenylphenoxy)phenyl]-
    phenyloxy]phenoxy]phenoxy}biphenyl
4'-{m-[o-[m-(o-phenylphenoxy)phenoxy]phenoxy]
    phenoxy}m-terphenyl
4-{m-[p-[m-(p-phenylphenoxy)phenoxy]phenoxy]
    phenoxy}-m-terphenyl 12. 8 phenyl 5 oxyether 3-[m-(o-phenoxyphenoxy)phenoxy]-3'-[m-(o-
    phenylphenoxy)-phenoxy]biphenyl
3-[o-(o-phenoxyphenoxy)phenoxy]-3''-(m-phenox-
    yphenoxy)-m-terphenyl
4-[p-(m-phenoxyphenoxy)phenoxy]-4'-[p-(m-
    phenoxyphenoxy)phenoxy]biphenyl
3-]m-(o-phenoxyphenoxy)phenoxy]-4'-(m-phenoxy-
    phenoxy)-m-terphenyl 13. 8 phenyl 6 oxyether 3,3'-bis[m-(m-phenoxphenoxy)phenoxy]biphenyl
4,4'-bis[m-(o-phenoxyphenoxy)phenoxy]biphenyl
1-[m-(p-phenoxyphenoxy)phenoxy]-3-m-[m-(p-
    phenylphenoxy)phenoxy]phenoxy benzene
1-[o-(m-phenoxyphenoxy)phenoxy]-3-{m-[o-(m-
    phenylphenoxy)phenoxy]phenoxy}benzene

EXAMPLE VII 3,3'-Bis[m-(m-phenoxyphenoxy)phenoxy]biphenyl

A 250 ml. four-necked flask, equipped with stirrer, dropping funnel, thermometer, and Dean-Stark trap surmounted by a Friedrichs condenser was charged with 59.8 g. (0.215 mole) of m-(m-phenoxyphenoxy)-phenol to which 13.0 g. 0.208 mole) of potassium hydroxide was added at 90°C. followed by addition of 50 ml. of toluene. The stirred reaction mixture was heated to azeotrope water, followed by distillation of toluene until the temperature of the reaction mixture reached 230°C. To this mixture after cooling was added 50 ml. of diglyme, 2.5 g. of cuprous chloride, 0.5 g. of copper powder, and 20 g. (0.09 mole) of 3,3'-dichlorobiphenyl over a 30 min. period at 175 C. Diglyme was distilled from the reaction mixture which was then heated at 230°–260°C. for 18 hr. The cooled very thick semisolid mass resulting was dissolved in 500 ml. of ethyl ether and the suspended salts removed by centrifugation. The resulting ethereal solution was washed thoroughly with 10% potassium hydroxide solution and with water until neutral, and finally dried over anhydrous magnesium sulfate. After concentrating this solution, it was distilled using a 25 ml. still pot attached to a Claisen head and fraction cutter. Distillation using a Wood's metal bath on the still pot gave 10 g. of viscous red-orange liquid, bp 348°–352°C/0.09 mm. at a pot temperature of 428°C. Elemental analysis showed this cut to be about 80% of the desired product and 20% 3-chloro-3'-[m-(m-phenoxyphenoxy)phenoxy]biphenyl. The pot residue was dissolved in 300 ml. of ethyl ether, treated with 1 g. of activated charcoal and filtered through filter aid. The ether was removed under vacuum to yield a light orange product, bp 380°–390°C/0.05 mm., $n_D^{25}$ 1.658.

Calculated for $C_{48}H_{34}O_6$: c, 81.5; H, 4.9. Found: C, 81.6; H, 5.0.

14. 9 phenyl 4 oxyether

3-[m-(m-phenoxyphenoxy)phenoxy]-3''''-(m-
    phenoxy)-m,p,m'-quinquephenyl
3,3''''-bis-(m-phenoxyphenoxy)-m,m',p''-quin-
    quephenyl
3-[m-(m-phenoxyphenoxy)phenoxy]-3'''-(m-
    phenylphenoxy)-m,o'-quaterphenyl
3-[m-(m-phenoxyphenoxy)phenoxy]-3''-m-(3-
    biphenylylphenoxy)-m-terphenyl
1,3-bis  m-[o-(m-phenylphenyl)phenoxy]phenoxy
    benzene
3- m- o- m- o-[m-(o-phenylphenoxy)phenyl]-
    phenoxy phenyl phenoxy phenoxy biphenyl
4- m- m- m- o-[m-(o-phenylphenoxy)phenyl]-
    phenoxy phenyl phenoxy phenoxy biphenyl 15. 9 phenyl 5 oxyether 3-[m-(m-phenoxyphenoxy)phenoxy]-3'''-(m-
    phenoxyphenoxy)-m,m'-quaterphenyl
3-{m-[m-(m-phenoxyphenoxy)phenoxy]phenoxy}-
    3-(m-phenoxy)-m,m'-quaterphenyl 3-{m-[m-(m-phenoxyphenoxy)phenoxy]phenoxy}-3-(o-phenoxy)-m,m'-quaterphenyl 3-{m[m-(m-phenoxyphenoxy)phenoxy]phenoxy}-3-(p-phenoxy)-m,m'-quaterphenyl 3-{m-[m-[p-[m-(o-phenylphenyl)phenoxy]phenoxy]phenoxy]-phenoxy}-m-terphenyl 4-{m-[o-[m-[m-(o-phenylphenyl)phenoxy]phenoxy]phenoxy]-phenoxy}-m-terphenyl 4-{m-[o-[p-[m-(m-phenylphenyl)phenoxy]phenoxy]phenoxy]-phenoxy}-m-terphenyl 16. 9 phenyl 6 oxyether 3,3''-bis[m-phenoxyphenoxy)phenoxy]-m-terphenyl 3-{m-[o-(o-phenoxyphenoxy)phenoxy]phenoxy}-3''-(m-phenoxyphenoxy)-m-terphenyl 4,4'-bis[m-(o-phenoxyphenoxy)phenoxy]-m-terphenyl 4,4''-bis[m-(m-phenoxyphenoxy)phenoxy]-p-terphenyl

EXAMPLE VIII 4,4'-Bis[m-(m-phenoxyphenoxy)phenoxy]-m-terphenyl

Following the general procedure described in Example VII, 4,4'-bis[m-(m-phenoxyphenoxy)phenoxy]-m-terphenyl is prepared by substituting 27 g. (0.09 mole) 4,4'-dichloroterphenyl for the 3,3'-dichlorobiphenyl of Example VII as the co-reactant with m-(m-phenoxyphenoxy)phenol. The desired product is recovered and purified substantially as described.

17. 9 phenyl 7 oxyether

3-[m-(m-phenoxyphenoxy)phenoxy]-3'-m-[o-(o-phenoxyphenoxy)phenoxy]phenoxy biphenyl

4-[m-(m-phenoxyphenoxy)phenoxy]-4'-p-[m-(o-phenoxyphenoxy)phenoxy]phenoxy biphenyl 1-{m-[o-(m-phenoxyphenoxy)phenoxy]phenoxy}-3-{m-[o-(o-phenylphenoxy)phenoxy]phenoxy}benzene 1-{m-[p-(p-phenoxyphenoxy)phenoxy]phenoxy - 3 m-[m-(p-phenylphenoxy)phenoxy]phenoxy}-benzene 18. 10 phenyl 5 oxyether 3-[m-(m-phenoxyphenoxy)phenoxy]-3''-[m-(m-phenylphenyl)phenoxy]-m,m'-quaterphenyl 1,3-bis m-[m-(m-phenylphenyl)phenoxy]phenoxy biphenyl 3-{m-[m-[m-[m-(m-phenylphenoxy)phenyl]-phenoxy]phenyl]-phenoxy]phenoxy}-m-terphenyl 4-{m-[o-[o- m-[m-(p-phenylphenoxy)phenyl]-phenoxy]phenyl]-phenoxy phenoxy}-m-terphenyl

EXAMPLE IX 3,3'-Bis m-[m-(m-phenoxyphenoxy)phenoxy]phenoxy biphenyl

Following the general procedure described in Example VII, 3,3'-bis m-[m-(m-phenoxyphenoxy)phenoxy]phenoxy biphenyl is prepared by substituting 69 g. (0.215 moles) of m-[m-(m-phenoxyphenoxy)phenoxy]phenol for the m-(m-phenoxyphenoxy)phenol of Example VII as the co-reactant with 3,3'-dichlorobiphenyl, the desired product is recovered and purified substantially as described.

The following example illustrates the preparation of mixtures of x,x'-bis(m-phenoxyphenoxy)biphenyls which are also included within the scope of the present invention.

EXAMPLE X

A sample of chlorinated biphenyl containing 32 percent chlorine, i.e., about 2 chlorine atoms per biphenyl molecule, was introduced into a reaction vessel and isomerized at about 180°C. for about 2 hours with 10 weight percent of anhydrous aluminum chloride catalyst to convert 4,4'-dichlorodiphenyl isomers into primarily the 3,3'- and 3,4'-isomers. The mixture was cooled, degassed of HCl, and neutralized with sodium bicarbonate. The resulting mixture was distilled, and distillate collected over the range of 100°C. to 180°C. at 0.35 mm. of mercury was recovered as the desired isomerized product.

To a reaction vessel similar to that described in Example I was added 186 organic g. of m-phenoxyphenol (1 mole), 42 g. of potassium hydroxide (0.75 mole) and 50 ml. of toluene. After all of the water had been distilled off, the reaction mixture containing the potassium m-phenoxphenate was heated to 170°C. to remove all traces of toluene. Then 5 g. of cupric chloride was added to the reaction mixture and 24.3 g. of isomerized dichlorobiphenyl (0.109 mole) added thereto over a 0.5 hour period. This reaction mixture was heated at 200° to 210°C. for 16 hours with stirring, cooled, the still warm reaction mixture taken up in excess 3N potassium hydroxide and benzene, filtered through Hy Flo Super Cel, the aqueous phase removed, the organic phase washed with additional potassium hydroxide solution, the aqueous phase removed, and the orgaic phase dried over anhydrous magnesium sulfate. The benzene was then removed under reduced pressure and the reaction mixture distilled under vacuum and the x,x'-bis(m-phenoxyphenoxy)biphenyl composition boiling over the range of 260° to 305°C. at 0.1 mm. of mercury recovered. The product was redistilled and the fraction boiling from 295° to 300°C. at 0.1 to 0.2 mm. of mercury recovered. The recovered composition was warmed and filtered through a filter bed consisting of attapulgus clay and alumina.

Calculated for $C_{36}H_{26}O_4$: C, 82.73; H, 5.01. Found: C, 82.54, 82.74; H, 5.13, 5.20.

The x,x'-bis(m-phenoxyphenoxy)biphenyl composition consists essentially of the 3,3'- and 3,4'-isomers, and was observed to be a clear, viscous fluid at room temperature having a thermal decomposition point of about 837°F. and a boiling point of about 1038°F.

The phenoxybiphenyl and -terphenyl compounds encompassed by this invention are useful as hydraulic and heat transfer fluids and demonstrate a high degree of thermal stability even at temperatures exceeding 600°F. Test data showing the thermal stability and the viscosity of the fluids prepared in Examples I to VII are given in the table below.

| Compound | Thermal Stability | Viscosity, cs. 210°F. | 400°F. |
|---|---|---|---|
| Ex. I | 799°F. | 18.9 | 2.3 |
| Ex. II | 776°F. | 98.7 | 3.8 |
| Ex. III | 822°F. | 39.6 | 3.3 |
| Ex. IV | 775°F. | 46.1 | 3.3 |
| Ex. V | 819°F. | 40.8 | 3.5 |
| Ex. VI | 828°F. | 64.3 | 4.5 |
| Ex. VII | 806°F. | 205.7 | 7.3 |

The thermal stability was determined as the temperature at which the decomposition of the compound produced a pressure rise of 0.014 mm. Hg./sec. according to the procedure described in *Chemical and Engineering Data*, Vol. 6, No. 1, page 89.

The preceding examples are intended to illustrate several embodiments of the instant invention. The scope and limits of the invention are defined by the appended claims.

The embodiments of this invention in which an exclusive property or privilege is claimed are defined as follows:

1. A functional fluid composition consisting essentially of a mixture of x,x'di(phenoxyphenoxy)biphenyls wherein at least 40 percent of the total linkages in said composition are in the meta position.

2. A functional fluid consisting essentially of a mixture of 3,3'- and 3,4'- bis (m-phenoxyphenoxy)biphenyl.

* * * * *

UNITED STATES PATENT OFFICE
CERTIFICATE OF CORRECTION

PATENT NO. : 3,957,666
DATED : May 18, 1976
INVENTOR(S) : Hammann, et al.

It is certified that error appears in the above-identified patent and that said Letters Patent are hereby corrected as shown below:

On cover page under References Cited, 1st and 3rd lines,
"Scnisla" should read -- Schisla --

Col. 1, line 50, "hign-degree" should read -- high degree --

Col. 3, line 7, "phenyl[" should read -- phenyl] --

Col. 6, line 61, "bipheny" should read -- biphenyl --

Col. 9, line 56, "3-{m-['m-['o-[m-(o-phenylphenoxy)phenyl]-phenyloxy']phenoxy']phenoxy}biphenyl"
should read -- 3-{m-["m-['o-[m-(o-phenylphenoxy)phenyl]-phenyloxy']phenoxy"]phenoxy}biphenyl --

Col. 10, line 1, "3-]m" should read -- 3-[m --

Col. 10, line 26, 175 C." should read -- 175°C. --

Col. 10, line 47, "c," should read -- C, --

Col. 11, line 7, "4-{m-[o-" should read -- 4-{m-["o- --

Col. 11, end of line 40 to line 41, "phenoxy -3 m-[m-"
should read -- phenoxy}-3-{m-[m- --

Col. 11, line 48, "3-{m-["m-["m-['m-[m-(m-phenylphenoxy)phenyl]-phenoxy']phenyl"]-phenoxy"]phenoxy}-m-terphenyl"
should read -- 3-{m-["'m-["m-['m-[m-(m-phenylphenoxy)phenyl]-phenoxy']phenyl"]-phenoxy'"]phenoxy}-m-terphenyl --

UNITED STATES PATENT OFFICE
CERTIFICATE OF CORRECTION

PATENT NO. : 3,957,666
DATED : May 18, 1976
INVENTOR(S) : Hammann, et al.

It is certified that error appears in the above-identified patent and that said Letters Patent are hereby corrected as shown below:

Col. 11, line 50, "4-{m-["o-["o- 'm-[m-(p-phenylphenoxy)phenyl]-
']phenoxy"]phenyl"]-phenoxy phenoxy}-m-terphenyl"
should read -- 4-{m-["'o-["o-['m-[m-(p-phenylphenoxy)phenyl]-
phenoxy']phenyl"]phenoxy'"]phenoxy}-m-terphenyl --

Col. 12, line 20, "m-phenoxphenate" should read
-- m-phenoxyphenate --

Col. 12, line 31, "orgaic" should read -- organic --

Signed and Sealed this

[SEAL]

Fourteenth Day of September 1976

Attest:

RUTH C. MASON
*Attesting Officer*

C. MARSHALL DANN
*Commissioner of Patents and Trademarks*